Feb. 3, 1942.　　　　G. V. WOODLING　　　　2,271,881
EFFECTIVE TEMPERATURE INDICATING DEVICE
Filed July 3, 1939
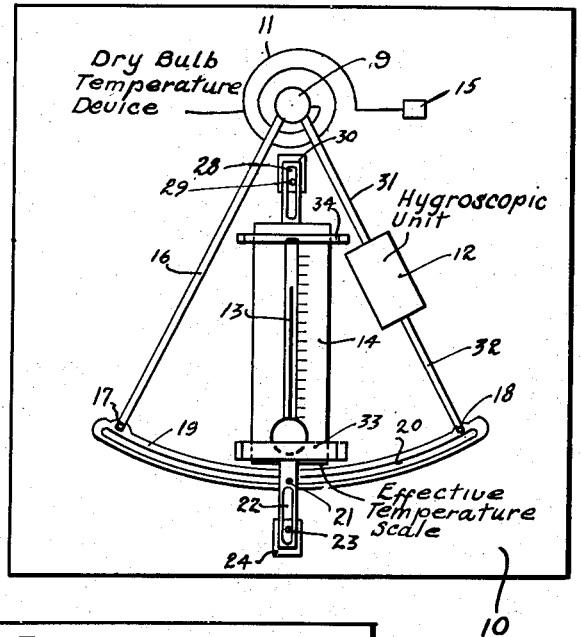
FIG 1
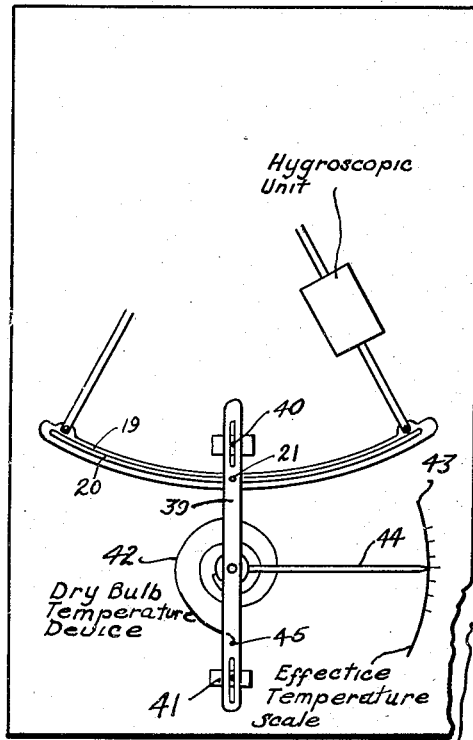
FIG 2
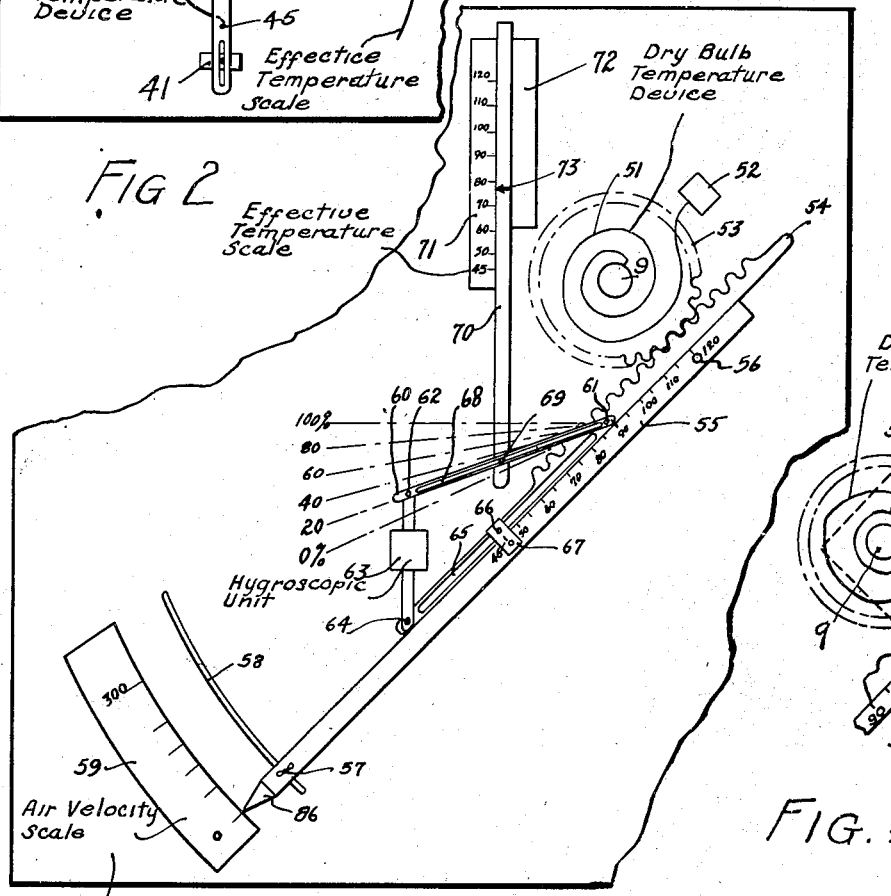
FIG 3
FIG. 4.
INVENTOR.
George V. Woodling Patented Feb. 3, 1942

2,271,881

UNITED STATES PATENT OFFICE 2,271,881

EFFECTIVE TEMPERATURE INDICATING DEVICE

George V. Woodling, Cleveland, Ohio

Application July 3, 1939, Serial No. 282,572

19 Claims. (Cl. 73—336)

My invention relates, in general, to measuring devices, and more particularly to means for measuring the condition of the air to indicate the degree of comfort.

The human comfort or discomfort, as regards feeling of warmth, depends largely upon the body temperature, and, therefore, upon the relation between the rate of production and dissipation of heat.

By the process of metabolism, heat is constantly generated within the body. Accordingly, this heat must be eliminated from the surface of the body and from the respiratory tract by radiation, convection and evaporation. Hence, to maintain a constant body temperature, the heat loss of the body must equal the heat produced. It is, therefore, apparent that any reduction in the elimination of heat from the body must result in a rise in the temperature and a corresponding feeling of discomfort. As the temperature of the air and surrounding objects rise, the loss of heat by convection and radiation decreases. When the air temperature reaches that of the body, the loss by radiation and convection ceases. Finally, as the air temperature exceeds that of the body, heat is transferred from the air to the body. As the temperature of the air rises and heat loss by radiation and convection decreases, the body endeavors to maintain temperature equilibrium by making available more perspiration, thus resulting in a greater heat loss by evaporation.

From the foregoing, one notes that there must necessarily exist certain combinations of temperatures, humidities, and air motions, which produce the same total heat loss by radiation, convection, and evaporation; and, therefore, the same feeling of comfort or discomfort. Therefore, the comfort or discomfort of the human body depends not only upon the temperature of the surrounding air as registered by a dry-bulb thermometer, but also upon the humidity, together with the air motion.

The combinations of temperature, humidity, and air movement which produce the same feeling of warmth are called "thermo-equivalent conditions" or "comfort indexes." Elaborate experiments conducted by the Research Laboratory of the United States Bureau of Mines, Pittsburgh, Pennsylvania, and published in the Transactions of the American Society of Heating and Ventilating Engineers from 1923 to the present date, by F. C. Haughten and C. P. Yaglou, show that this newly-developed scale of thermo-equivalent conditions, or effective temperatures not only indicates the sensation of warmth, but also determines the physiological effects on the body induced by heat and cold.

Psychrometric charts with effective temperature lines, for persons normally clothed and slightly active, for still air conditions and for an air velocity of 300 feet per minute are shown in Figures 1 and 2 of my Patent No. 2,142,593 issued January 3, 1939, entitled Air conditioning.

The effective temperature or the comfort index being an experimentally determined scale, unlike the dry-bulb and wet-bulb temperature scales, is a true measure or index of a person's feeling of warmth in all combinations of temperature, humidity and air movements. In other words, for any one given effective temperature, a person feels the same degree of warmth or coldness regardless of the dry-bulb temperature, the humidity, and velocity of the air required to produce that particular effective temperature.

Therefore, an object of my invention is to provide for giving a measurement of the human comfort.

Another object of my invention is to provide for giving a measurement of the human comfort in terms of the combination of the dry-bulb temperature, the relative humidity, and the air velocity.

A further object of my invention is to so modify the measurements of the dry-bulb temperature as to correct for changes in the moisture and the air velocity, and thereby effect a modified measurement that is a true index of a person's feeling of comfort.

A still further object of my invention is to translate three movements into a single resultant movement.

A further object of my invention is to provide for giving a subtrahend based upon the condition of the air and for subtracting this subtrahend value from the dry-bulb temperature to give a measurement of the human comfort.

Another object of my invention is to provide for setting the air motion off on the comfort indicating device to correspond either to the prevailing natural air motion or to that created by the fan.

Other objects and a fuller understanding of my invention may be had by referring to the following specification and claims, taken in connection with the accompanying drawing, in which:

Figure 1 is a plan view of an indicator embodying the features of my invention;

Figure 2 is a fragmentary plan view of a modified form of my indicator;

Figure 3 is another embodiment of my invention for indicating human comfort; and Figure 4 is a fragmentary view of Figure 3 and shows an arrangement which permits large movement of the pointer 86.

With reference to Figure 1 of the drawing, my indicator comprises the arrangement of means for vertically actuating an ordinary thermometer scale 14 relative to an ordinary thermometer 13 placed adjacent thereto. The scale 14 is moved vertically through a distance which is a measure of the amount to be subtracted from the dry-bulb temperature reading to equal the effective temperature reading. The vertical shifting of the scale 14 may be accomplished by securing the upper and lower ends of the scale 14 by means of a slot and pin arrangement through the base 10. The upper slidable connecting means may comprise a pin 29 which fits within the longitudinal slot 28 and which is fastened to an anchoring block 30 suitably fastened to the base 10. The lower slidable connecting means may comprise a pin 23 which fits within a longitudinal slot 22 and which is anchored to a block 24 suitably fastened to the base 10. The thermometer 13 may be anchored stationarily by means of a lower bracket 33 into which the bulb of the thermometer rests and a bracket 34 which engages the upper end of the thermometer. The brackets 33 and 34 may be suitably fastened to the base 10 and arranged to give freedom to vertical movement of the slidable scale 14.

The slidable scale 14 may be actuated up and down in response to a dry bulb temperature unit 11 and a hygroscopic unit 12. The dry bulb temperature unit 11 may be in the form of a coiled bi-metallic element having its inner end fastened to a rotating shaft 9 which may be rotatively mounted in the base 10 and having an outer end which may be anchored to a block 15 suitably fastened to the base 10. Therefore, as the dry-bulb temperature increases the shaft 9 of the temperature unit 11 rotates in a clock-wise direction. The hygroscopic element 12 may be of any suitable construction and form and may comprise a moisture responsive element of human hair, cellulose material, ribbon paper, or any other material which expands and contracts in response to the moisture content. The hygroscopic unit 12 is shown diagrammatically and the diagrammatic illustration embodies not only the moisture responsive element but also the mechanical arrangement for holding the moisture responsive element as well as the linkage system for multiplying the movement of the moisture responsive element.

The subtraction may be accomplished by means of a slotted actuating arm 19 which is provided with a longitudinal slot 20 which engages a pin 21 fastened to the sliding scale 14. The left hand end of the slotted actuating arm 19 may be pivotally connected at 17 to an arm 16 having its upper end securely fastened to the rotating shaft 9 of the temperature unit 11. The right hand end of the slotted actuating arm 19 may be pivotally connected at 18 to an arm 32 having its upper end connected to the hygroscopic element 12 and an arm 31 which interconnects the upper end of the hygroscopic element 12 and the shaft 9 of the dry bulb temperature unit 11. Therefore as the moisture variation changes the position of the right hand end of the slotted actuating arm 19 the latter is actuated up and down and swings about the pivot point 17. For the purpose of illustration, the position of the actuated arm 19 as shown in the drawing may be referred to as zero relative humidity. As the humidity increases the pivot point 18 may drop substantially in accordance with the construction lines which coincide with the relative humidity readings of 20, 40, 60, 80, and 100.

In laying out the dimensions of the parts of my indicator, the pivot point 17 would coincide with the pin 21 when the dry bulb temperature unit 11 reads 45 degrees and the pivot point 18 would coincide with the pin 21 when the dry bulb temperature unit 11 reads 120 degrees. With this construction the subtraction movement is substantially zero when the dry bulb temperature reading is in the neighborhood of 45 degrees and the subtraction movement is a maximum when the dry bulb temperature is in the neighborhood of 120 degrees. That is to say, the effective temperature lines upon the psychrometric chart previously referred to are substantially perpendicular in the neighborhood of 45 degrees and are disposed at a maximum slope in the neighborhood of 120 degrees Fahrenheit. In my arrangement the vertical movement of the scale 14 is a measurement of the amount to be subtracted from the dry-bulb temperature to equal the effective temperature. The subtraction movement is a variable one depending upon the reading of the dry bulb temperature and the reading of the relative humidity. My arrangement may be characterized as a variable mechanical advantage which changes in accordance with the distance that the pivot point 17 is moved away from the pin 21. In the position as shown the dry bulb temperature is in the neighborhood of 82½ degrees and the relative humidity is zero. Under this condition, the effective temperature is in the neighborhood of 70 degrees which means that the sliding scale 14 has been moved relative to the thermometer by an amount in the neighborhood of 12½ units. Thus, instead of the mercury or liquid column of the thermometer reading 82½ degrees it reads 70 units which is the measurement of the effective temperature.

In Figure 2 I show a modification of my invention as shown in Figure 1, in that the ordinary thermometer is replaced by a coiled bi-metallic temperature indicator 42 having its outer end anchored at 45 to a vertically sliding member 39 and having its inner end connected to a rotatable shaft having a bearing in the vertically sliding member 39. The slidable vertical member 39 may be arranged to slide vertically by means of the sliding arrangements 40 and 41 located, respectively, at the upper and lower ends of the sliding member 39. The slidable vertical member 39 is actuated up and down by means of the pin 21 engaging the longitudinal slot 20 of the actuating arm 19. As the bi-metallic unit 42 is moved up and down the indicating hand 44 is shifted with respect to the scale 43 so that the higher the moisture content or relative humidity the higher the effective temperature reading upon the scale 43. The variable mechanical advantage in Figure 2 operates in the same manner as that discussed in Figure 1 and functions to subtract a value from the dry bulb temperature value to equal the effective temperature in which the subtracted value is a function of the dry bulb temperature and the relative humidity.

In Figure 3 I show a modified arrangement of my invention in that instead of employing a thermometer or a second bi-metallic temperature unit, I utilize only one temperature responsive device which actuates an elongated slidable motion transmission rack member. The slidable motion transmission rack member is positioned at an angle with a vertically movable elongated slidable member carrying an index for registration with the graduations of a linear effective temperature scale so that the vertical component of the movement of the slidable motion transmission rack member is transmitted to the index carrying member through the variable mechanical advantage of my system. In Figure 3 the dry bulb temperature unit is indicated by the reference character 51 and may be in the form of a coiled bi-metallic element having its outer end anchored to a block 52 suitably fastened to the base 50 and having its inner end fastened to a shaft 9 suitably rotatively mounted in the base 50. Mounted upon the rotating shaft of the temperature responsive device 51 is a gear wheel 53 which engages the teeth in an elongated slidable motion transmission rack 54 which slidably engages a dry bulb temperature scale member 55. The upper end of the dry bulb temperature scale member 55 is pivotally connected at 56 to the base 50 and the lower end of the dry bulb temperature scale member 55 is provided with an adjusting nut 57 threadably secured to a sliding threaded member that fits within the elongated slot 58 of the base 50. The lower end of the dry bulb temperature scale member 55 is pointed as at 86 to register with an air velocity scale 59 mounted upon the base 50. In order to adjust the dry bulb temperature scale member 55 for any prevailing air velocity it is only necessary to loosen the thumb nut 57 and adjustably position the pointer 86 to register with the air velocity scale 59, after which the screw 57 may be again set. In the position shown the air velocity setting is zero.

The normal clearance between the rack and pinion drive is sufficient to allow for a certain amount of movement of the pointer 86. Only a slight clearance is needed since the pivot pin 56 is located close to a tangent to the gear wheel 53. If additional movement of the pointer 86 be needed, it may be provided by making the gear wheel small in diameter. Large movements of the pointer 86 may be taken care of by any suitable arrangement. A simple arrangement is shown in Figure 4, where the gear wheel 53 and the anchoring block 52 are mounted upon a common plate 80 secured by screws 81 or other suitable means to the member 55.

The lower end of the slidable member 54 is provided with an elongated slot 65 in which is positioned a pin 66 carried by a cross member 67 fastened to the dry bulb temperature scale member 55. This arrangement slidably secures the slidable member 54 against the dry bulb temperature scale member 55. The upper end of the slidable member 54 is slidably secured against the dry bulb temperature scale member 55 by the co-action of the teeth on the gear wheel 53 and the teeth on the slidable member 54. Pivotally connected to the slidable member 54 is an actuating arm 60 having a slot 68 in which a pin 69 may slide for actuating the vertically movable elongated member 70 having an indication pointer 73 thereon that indicates the effective temperature reading upon the effective temperature scale 71. The vertically movable member 70 is arranged to freely slide between the effective temperature scale 71 and a block 72 both of which may be suitably fastened to the base 50. The right hand end of the actuating arm 60 may be connected to the slidable member 75 by means of a suitable pivot connection 61. The left hand end of the actuating arm 60 is arranged to be actuated up and down by means of a suitable hygroscopic element 63 which is pivotally anchored at 64 to the lower end of the slidable member 54. The hygroscopic element 63 may be of any suitabe form and construction and the diagrammatic illustration represents not only the moisture responsive element but also the means for holding the moisture responsive element as well as the linking system for multiplying the movement of the hygroscopic element.

As illustrated, the dry bulb temperature scale member 55 is positioned at an angle with reference to the vertical member 70 so that the vertical component of the movement of the slidable member 54 is transmitted to the vertical member 70 and so that the horizontal component of the movement of the slidable member 54 takes care of the change in the variable mechanical advantage brought about by varying the distance between the pivot point 62 and the pin 69. The vertical member 70 and the dry bulb temperature scale member 55 are so positioned that there is no subtraction produced by my linking system when a vertical line passing through the slidable member 70 passes through a datum point on the slidable member 54 and this datum point is in registration with the 45 degree graduation on the scale member. That is to say when the pivot point 61 coincides substantially with the reading 45 upon the dry bulb temperature scale member 55 there is no subtraction effected by my system because the pin 69 is residing close to the pivot point 61. The pivot point 62 represents a temperature of 120 degrees which means that a maximum amount of subtraction is effected because when the dry bulb temperature element 51 reads 120 degrees the pivot pin 69 is registering with the pivot pin 62. In the position of the parts indicated in Figure 3 the dry bulb temperature is reading 90 degrees and the relative humidity is indicating 20 percent. Under this condition the effective temperature is 77 units which means that there is a subtraction of 13 units. In other words, the indication mark 73 upon the vertical movable member 70 has been lowered by an amount of 13 degrees to give an effective temperature indication of 77 units. When the relative humidity is 100 percent the actuating arm 60 is substantially horizontal and as the relative humidity decreases the actuating lever 60 may coincide with the construction line indicated as 80%, 60%, 40%, 20% and zero percent.

Should the air velocity be 300 feet per minute as a prevailing condition then the dry bulb temperature scale member 55 may be set so that the pointer 86 registers with the 300 feet per minute mark. Upon swinging the dry bulb temperature scale member 55 about the pivot point 86 until the pointer 56 registers with the 300 feet per minute registration the dry bulb temperature scale member 55 will intersect the vertical line passing through the slidable member 70 in the neighborhood of 56 degrees which means that the effective temperature lines are substantially vertical in the region of 56 degrees upon the psychrometric chart for 300 feet per minute.

In Figures 1 and 2, I employ a temperature unit and a hygroscopic unit to obtain the subtraction value and then I subtract the subtraction value from a value obtained from a second temperature unit to produce the effective temperature reading. In Figure 3, I utilize a single temperature unit which performs a double function; in that (1) the horizontal component and the hygroscopic unit give the subtraction value and (2) the vertical component less the subtraction value give the final effective temperature reading.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A device for giving a composite measurement based upon temperature and moisture comprising, in combination, first dry bulb temperature means for giving a measurement, subtraction means for reducing the dry bulb temperature measurement to produce the composite measurement, said subtraction means including variable mechanical advantage means, hygroscopic humidity means for actuating the variable mechanical advantage means, second dry bulb temperature means, means for moving the hygroscopic humidity means by the second dry bulb temperature means, and means for actuating the variable mechanical advantage means by the second dry bulb temperature means.

2. A device for giving a composite measurement based upon temperature and moisture comprising, in combination, measurement means for giving the said composite measurement, dry bulb temperature means for transmitting movement to said measurement means, subtraction means for reducing the transmitting movement of the dry bulb temperature means, said subtraction means including an actuating member having an intermediate portion engaging said measurement means to actuate the same, swingable connection means for swingably connecting one end of the actuating member to the dry bulb temperature means, hygroscopic humidity means, means for swingably operating the actuating member about the swingable connection means by the hygroscopic humidity means, and means for carrying the hygroscopic humidity means by the dry bulb temperature means.

3. A device for giving a composite measurement based upon temperature and moisture comprising, in combination, measurement means for giving the said composite measurement, dry bulb temperature means for transmitting movement to said measurement means, subtraction means for reducing the transmitting movement of the dry bulb temperature means, said subtraction means including an actuating member having an intermediate portion engaging said measurement means to actuate the same, swingable connection means for swingably connecting one end of the actuating member to the dry bulb temperature means, hygroscopic humidity means, and means for swingably operating the actuating member about the swingable connection means by the hygroscopic humidity means, the said dry bulb temperature means upon an increase in temperature increasing the distance between the swingable connection means and the point at which the intermediate portion of the actuating member engages the measurement means.

4. A device for giving a measurement based upon temperature and moisture comprising, in combination, a thermometer having an adjacently disposed scale, motion transmission means for producing relative movement between the thermometer and the scale, dry bulb temperature means, hygroscopic humidity means, and means for operating the motion transmission means by both the dry bulb temperature means and the hygroscopic humidity means.

5. Means for giving a measurement of the effective temperature comprising, a temperature responsive element, a movable element actuated by the temperature responsive element, a hygroscopic humidity element carried by said movable element, and measurement means operated by said elements, the hygroscopic humidity element, the temperature responsive element, the movable element and the measurement means operated by said elements being structurally interrelated and comprising a variable mechanical advantage linkage system, the rate at which the hygroscopic humidity element of said system influences the movement of said measurement means is greater at higher temperatures than at lower temperatures and that the value of said measurement lies between the value of the dry bulb temperature and the temperature that would be registered by a wet bulb thermometer.

6. A device for giving a measurement based upon the temperature and the moisture comprising, in combination, dry bulb temperature means, hygroscopic humidity means movable with said dry bulb temperature means, measurement means movable by the conjoint control of these means for giving said measurement, mechanical connection means interconnecting the dry bulb temperature means and the hygroscopic humidity means and movable by both of said means, the dry bulb temperature means transmitting the major part and the hygroscopic humidity means transmitting the minor part of the movement to the measurement means and the movement of the hygroscopic humidity means subtracting from the movement of the dry bulb temperature means, said measurement means engaging and being movable by the connection means, said dry bulb temperature means upon an increase in temperature increasing the distance between the point at which the mechanical connection means engages the dry bulb temperature means and the point at which the mechanical connection means engages the measurement means.

7. A device for giving a measurement based upon the temperature and the moisture comprising, in combination, dry bulb temperature means having a moving part, hygroscopic humidity means having a moving part, measurement means movable by the conjoint control of these means for giving said measurement, mechanical connection means interconnecting and allowing freedom of relative movement between the moving parts of the dry bulb temperature means and the hygroscopic humidity means and movable by both of said parts, the dry bulb temperature means transmitting the major part and the hygroscopic humidity means transmitting the minor part of the movement to the measurement means and the movement of the hygroscopic humidity means subtracting from the movement of the dry bulb temperature means, said dry bulb temperature means upon an increase in temperature increasing the distance between the point at which the mechanical connection means engages the dry bulb temperature means and the point at which the mechanical connection means engages the measurement means.

8. A device for giving a measurement based upon the temperature and the moisture comprising, in combination, dry bulb temperature means having a moving part, hygroscopic humidity means having a moving part, measurement means movable by the conjoint control of these means for giving said measurement, pivotal and slidable mechanical connection means interconnecting and allowing freedom of relative movement between the moving parts of the dry bulb temperature means and the hygroscopic humidity means and movable by both of said parts, the dry bulb temperature means transmitting the major part and the hygroscopic humidity means transmitting the minor part of the movement to the measurement means and the movement of the hygroscopic humidity means subtracting from the movement of the dry bulb temperature means, said dry bulb temperature means upon an increase in temperature increasing the distance between the point at which the mechanical connection means engages the dry bulb temperature means and the point at which the mechanical connection means engages the measurement means.

9. A device for giving a measurement based upon temperature and moisture comprising, in combination, measurement means including an elongated movable member for giving said measurement, variable mechanical advantage means for actuating the measurement means, dry bulb temperature means including an elongated motion transmission member positioned at an angle to the said elongated movable member, hygroscopic humidity means, means for actuating the variable mechanical advantage means by the dry bulb temperature means and the hygroscopic humidity means, means for moving the hygroscopic element means by the dry bulb temperature means, and means for varying the angle between the elongated motion transmission member and the elongated movable member of the measurement means.

10. In a device, including dry bulb temperature means and measurement means for giving a measurement of the effective temperature, means for giving a subtrahend value, said means comprising a lever arm having two ends, swingable connection means for mounting one of said ends to the dry bulb temperature means, hygroscopic humidity means, means for mounting the other said end to the hygroscopic humidity means, said measurement means engaging the lever arm intermediate its two ends, said hygroscopic humidity means actuating the lever arm about the swingable connection means on the dry bulb temperature means, the arrangement of the hygroscopic humidity means, the dry bulb temperature means and the measurement means being such that the rate at which the hygroscopic humidity means influences the subtrahend value is greater at higher temperatures than at lower temperatures.

11. Means for giving a measurement of the effective temperature comprising, in combination, measurement means including an elongated movable member for giving the said measurement, an elongated motion transmission member positioned at an angle with respect to the elongated movable member of the measurement means, an elongated actuating member, swingable connection means for swingably connecting one end of the elongated actuating member to the elongated motion transmission member, said elongated actuating member extending away from the swingable connection means and engaging the elongated movable member of said measurement means to actuate the same, dry bulb temperature means for actuating the elongated motion transmission member, hygroscopic humidity means for swingably operating the elongated actuating member about the swingable connection means, the component of movement of said elongated motion transmission member which is parallel to the said elongated movable member being transmitted to the said elongated movable member through the swingable connection means and the elongated actuating member and the other component of movement varying the distance between the swingable connection means and the said elongated movable member, said elongated motion transmission member increasing said distance upon an increase in temperature, the hygroscopic humidity means subtracting its movements from the said parallel movements of the elongated motion transmission member to make the resultant movement transmitted to the elongated movable member of the measurement means by the elongated actuating member equal to a function of the movement of the dry bulb temperature means less the movement of the hygroscopic humidity means.

12. Means for giving a measurement of the effective temperature comprising, in combination, measurement means including an elongated movable member for giving the said measurement, an elongated motion transmission member positioned at an angle with respect to the elongated movable member of the measurement means, an elongated actuating member, swingable connection means for swingably connecting one end of the elongated actuating member to the elongated motion transmission member, said elongated actuating member extending away from the swingable connection means and engaging the elongated movable member of said measurement means to actuate the same, dry bulb temperature means for actuating the elongated motion transmission member, hygroscopic humidity means for swingably operating the elongated actuating member about the swingable connection means, the component of movement of said elongated motion transmission member which is parallel to the said elongated movable member being transmitted to the said elongated movable member through the swingable connection means and the elongated actuating member and the other component of movement varying the distance between the swingable connection means and the said elongated movable member, said elongated motion transmission member increasing said distance upon an increase in temperature, the hygroscopic humidity means subtracting its movements from the said parallel movements of the elongated motion transmission member to make the resultant movement transmitted to the elongated movable member of the measurement means by the elongated actuating member equal to a function of the movement of the dry bulb temperature means less the movement of the hygroscopic humidity means, the hygroscopic humidity element means throughout its range of operation limiting the swingable movements of the elongated actuating member to angular positions in which the angle between the elongated movable member of the measurement means and the portion of the elongated actuating member extending therefrom to the swingable connection means is in the neighborhood of 90 degrees or less.

13. Means for giving a measurement of the effective temperature comprising, in combination, measurement means including an elongated movable member for giving the said measurement, an elongated motion transmission member positioned at an angle with respect to the elongated movable member of the measurement means and with a line passing longitudinally through the said elongated movable member intersecting the elongated motion transmission member at a datum point thereon corresponding substantially to 45 degrees temperature, an elongated actuating member, swingable connection means for swingably connecting one end of the elongated actuating member to the elongated motion transmission member, said elongated actuating member extending away from the swingable connection means and engaging the elongated movable member of said measurement means to actuate the same, dry bulb temperature means for actuating the elongated motion transmission member, hygroscopic humidity means for swingably operating the elongated actuating member about the swingable connection means, the component of movement of said elongated motion transmission member which is parallel to the said elongated movable member being transmitted to the said elongated movable member through the swingable connection means and the elongated actuating member and the other component of movement varying the distance between the swingable connection means and the said elongated movable member, said elongated motion transmission member increasing said distance upon an increase in temperature, the hygroscopic humidity means subtracting its movements from the said parallel movements of the elongated motion transmission member to make the resultant movement transmitted to the elongated movable member of the measurement means by the elongated actuating member equal to a function of the movement of the dry bulb temperature means less the movement of the hygroscopic humidity means.

14. Means for giving a measurement of the effective temperature comprising, in combination, measurement means including an elongated movable member for giving the said measurement, an elongated motion transmission member positioned at an angle with respect to the elongated movable member of the measurement means, an elongated actuating member having a first end portion, a second end portion and an intermediate portion, first end connection means for swingably connecting the first end portion of the elongated actuating member to the elongated motion transmission member, hygroscopic humidity means, second end connection means for swingably connecting the second end portion of the elongated actuating member to the hygroscopic humidity means, intermediate connection means for swingably connecting the said intermediate portion of the elongated motion transmission member to the elongated movable member of the measurement member, dry bulb temperature means for actuating the elongated motion transmission member, the component of movement of said elongated motion transmission member which is parallel to the said elongated movable member being transmitted to the said elongated movable member through the first end connection means and the elongated actuating member and the other component of movement varying the distance between the first end connection means and the said elongated movable member, said elongated motion transmission member increasing said distance upon an increase in temperature, the hygroscopic humidity means subtracting its movements from the said parallel movements of the elongated motion transmission member to make the resultant movement transmitted to the elongated movable member of the measurement means by the elongated actuating member equal to a function of the movement of the dry bulb temperature means less the movement of the hygroscopic humidity means.

15. Means for giving a measurement of the effective temperature comprising, in combination, measurement means including an elongated movable member for giving the said measurement, an elongated motion transmission member positioned at an angle with respect to the elongated movable member of the measurement means, an elongated actuating member, swingable connection means for swingably connecting one end of the elongated actuating member to the elongated motion transmission member, said elongated actuating member extending away from the swingable connection means and engaging the elongated movable member of said measurement means to actuate the same, dry bulb temperature means for actuating the elongated motion transmission member, hygroscopic humidity means for swingably operating the elongated actuating member about the swingable connection means, the component of movement of said elongated motion transmission member which is parallel to the said elongated movable member being transmitted to the said elongated movable member through the swingable connection means and the elongated actuating member and the other component of movement varying the distance between the swingable connection means and the said elongated movable member, said elongated motion transmission member increasing said distance upon an increase in temperature, the hygroscopic humidity means subtracting its movements from the said parallel movements of the elongated motion transmission member to make the resultant movement transmitted to the elongated movable member of the measurement means by the elongated actuating member equal to a function of the movement of the dry bulb temperature means less the movement of the hygroscopic humidity means, said hygroscopic humidity element means being movable with the elongated motion transmission member.

16. Means for giving a measurement of the effective temperature comprising, in combination, measurement means including an elongated movable member for giving the said measurement, an elongated motion transmission member positioned at an angle with respect to the elongated movable member of the measurement means, an elongated actuating member having a first end portion, a second end portion and an intermediate portion, first end connection means for swingably connecting the first end portion of the elongated actuating member to the elongated motion transmission member, hygroscopic humidity means, second end connection means for swingably connecting the second end portion of the elongated actuating member to the hygroscopic humidity means, intermediate connection means for swingably connecting the said intermediate portion of the elongated motion transmission member to the elongated movable member of the measurement member, dry bulb temperature means for actuating the elongated motion transmission member, the component of movement of said elongated motion transmission member which is parallel to the said elongated movable member being transmitted to the said elongated movable member through the first end connection means and the elongated actuating member and the other component of movement varying the distance between the first end connection means and the said elongated movable member, said elongated motion transmission member increasing said distance upon an increase in temperature, the hygroscopic humidity means subtracting its movements from the said parallel movements of the elongated motion transmission member to make the resultant movement transmitted to the elongated movable member of the measurement means by the elongated actuating member equal to a function of the movement of the dry bulb temperature means less the movement of the hygroscopic humidity element means, said hygroscopic humidity means being movable with the elongated motion transmission member.

17. Means for giving a measurement of the effective temperature comprising, in combination, measurement means including an elongated movable member for giving the said measurement, an elongated motion transmission member positioned at an angle with respect to the elongated movable member of the measurement means, an elongated actuating member, swingable connection means for swingably connecting one end of the elongated actuating member to the elongated motion transmission member, said elongated actuating member extending away from the swingable connection means and engaging the elongated movable member of said measurement means to actuate the same, dry bulb temperature means for actuating the elongated motion transmission member, hygroscopic humidity means for swingably operating the elongated actuating member about the swingable connection means, the component of movement of said elongated motion transmission member which is parallel to the said elongated movable member being transmitted to the said elongated movable member through the swingable connection means and the elongated actuating member and the other component of movement varying the distance between the swingable connection means and the said elongated movable member, said elongated motion transmission member increasing said distance upon an increase in temperature, the hygroscopic humidity means subtracting its movements from the said parallel movements of the elongated motion transmission member to make the resultant movement transmitted to the elongated movable member of the measurement means by the elongated actuating member equal to a function of the movement of the dry bulb temperature means less the movement of the hygroscopic humidity means, and means for varying the angle between the elongated motion transmission member and the elongated movable member of the measurement means.

18. In a device, including dry bulb temperature means and measurement means for giving a measurement of the effective temperature, means for giving a subtrahend value, said means comprising a lever arm having a mounting portion and an actuating portion, swingable connection means for swingably mounting said mounting portion of the lever arm to the dry bulb temperature means, said measurement means being movable by the actuating portion of the lever arm, hygroscopic humidity means for swingably actuating the lever arm about the swingable connection means on the dry bulb temperature means to transmit movement to the measurement means, the arrangement of the hygroscopic humidity means, the dry bulb temperature means and the measurement means being such that the rate at which the hygroscopic humidity means influences the subtrahend value is greater at higher temperatures than at lower temperatures.

19. A device for giving a measurement based upon temperature and moisture comprising, in combination, a dry bulb temperature device having an indicating member and an adjacently disposed scale, motion transmission means for producing relative movement between the indicating member and the scale, dry bulb temperature means, hygroscopic humidity means, and means for operating the motion transmission means by both the dry bulb temperature means and the hygroscopic humidity means.

GEORGE V. WOODLING.